United States Patent [19]

Smith

[11] 4,306,680
[45] Dec. 22, 1981

[54] COMPRESSION OPERATED INJECTOR

[75] Inventor: Richard H. Smith, Birmingham, Mich.

[73] Assignee: General Motors Corporation, Detroit, Mich.

[21] Appl. No.: 148,906

[22] Filed: May 12, 1980

[51] Int. Cl.³ .............................................. F02M 49/02
[52] U.S. Cl. ..................................... 239/87; 239/585; 417/380
[58] Field of Search .................... 123/467; 239/87, 95, 239/96, 585; 417/380, 402, 505

[56] References Cited

U.S. PATENT DOCUMENTS

| | | | |
|---|---|---|---|
| 2,572,118 | 10/1951 | Dickson | 239/87 |
| 3,055,593 | 9/1962 | May et al. | 239/87 |
| 3,782,352 | 1/1974 | Sparber | 239/533.1 |
| 3,919,989 | 11/1975 | Jarrett | 123/447 |
| 4,197,996 | 4/1980 | Giardini | 239/585 X |
| 4,247,044 | 1/1981 | Smith | 239/87 |

Primary Examiner—Andres Kashnikow
Attorney, Agent, or Firm—Arthur N. Krein

[57] ABSTRACT

A compression operated injector for delivering fuel directly to the combustion chamber of an engine has a piston which responds to the pressure in the combustion chamber and cooperates with a stepped plunger in the injector to pressurize fuel in both a control chamber and in an injector pump chamber. The discharge of fuel from the injection pump chamber for injection into the combustion chamber is controlled by a pressure operated valve. A solenoid actuated valve is used to control the escape of fuel from the control chamber so as to permit the piston to effect the necessary pressurization of the fuel in the injection pump chamber whereby to initiate the start of fuel injection.

4 Claims, 1 Drawing Figure

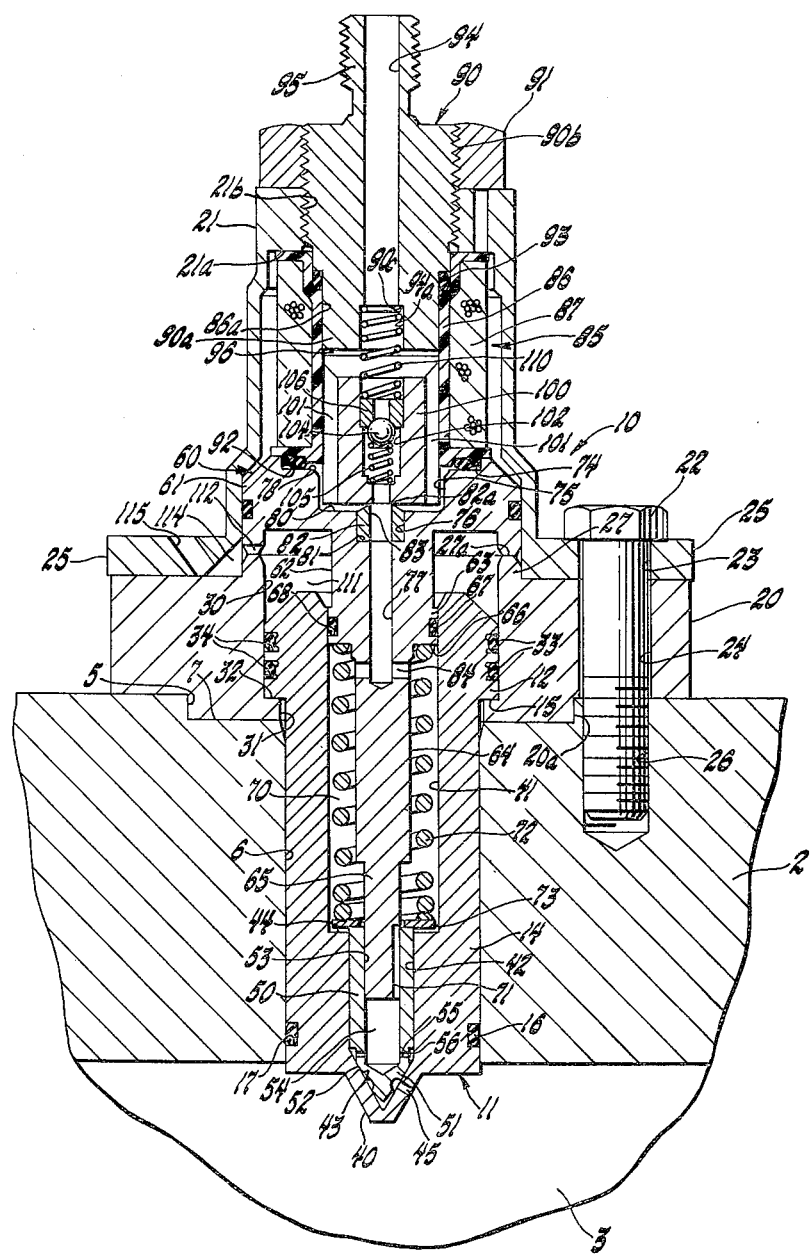

COMPRESSION OPERATED INJECTOR

FIELD OF THE INVENTION

This invention relates to a unit fuel injector of the type used to deliver fuel directly into the combustion chamber of an engine and, in particular, to such a device of the engine compression pressure operated type.

DESCRIPTION OF THE PRIOR ART

Engine compression pressure operated unit fuel injectors are well known in the prior art. Unit fuel injectors of this type include a pump unit having a piston positioned so as to be responsive to the combustion chamber pressure of an associated combustion chamber in an engine. The piston operates a pump plunger relative to a cylinder bushing in the injector assembly to create the necessary fuel pressure to effect injection of fuel out through an injection valve nozzle assembly into the combustion chamber of the engine.

In such prior art compression operated injectors, it has been conventional to provide a mechanical means to control the start and end of an injection cycle to thereby also control the quantity of fuel being injected. Being mechanically controlled, such prior art injectors were limited as to their capabilities for the precise controlling of the start and end of injection and thus for the control of the quantity of fuel being injected.

In modern day engines, it is now necessary and desirable to more closely control the operation of the engine so as to reduce the emissions from such engine and to improve fuel economy. In this regard, it is well known in the gasoline internal combustion engine art to utilize electronic fuel injection because of its adaptability to effect more efficient operation of the engine whereby to improve fuel economy and emission control.

SUMMARY OF THE INVENTION

Accordingly this invention relates to a compression operated injector wherein a compression operated power piston in cooperation with a pump element is used to pressurize fuel in an injection pump chamber defined thereby and to pressurize fuel in a control chamber on one side of the power piston. A solenoid valve is used to control the flow of pressurized fuel from the control chamber to thereby permit further pressurization of fuel in the injection pump chamber so as to effect unseating of a valve in the injection nozzle of the assembly whereby to effect injection of fuel. The solenoid valve is thus operative to permit accurate control to effect the start and end of injection and therefore to precisely control the quantity of fuel being injected during each pulse injection period.

It is therefore a primary object of this invention to provide an improved compression operated injector wherein a solenoid valve is incorporated into the injector assembly so as to effect control of the start and end of fuel injection into a combustion chamber of an engine.

Another object of this invention is to provide an improved compression operated injector which is adapted to be operated by engine compression pressure and which has a solenoid valve means incorporated therein to control the final pressurization of fuel to be injected and therefore to effect the actual discharge of such pressurized fuel.

Another object of this invention is to provide an improved compression operated injector having relatively few major components, which components are of relatively simple construction for economy of manufacture and convenience of assembly, and yet cooperate to provide an assembly which is trouble free in operation.

For a better understanding of the invention as well as other objects and further features thereof, reference is had to the following detailed description of the invention to be read in connection with the accompanying drawing.

BRIEF DESCRIPTION OF THE DRAWING

The FIGURE is a longitudinal cross-sectional view of a compression operated injector constructed in accordance with the invention and shown in assembled relationship in an opening provided therefore in an engine cylinder head.

DESCRIPTION OF THE EMBODIMENT

Referring now to the drawing, there is shown a portion of the cylinder head 2 of an engine having a compression operated fuel injector, generally designated 10, constructed in accordance with the invention, mounted thereon so that the nozzle tip of the injector projects into the combustion chamber 3 of the engine. For this purpose, the cylinder head 2 is provided, in the construction illustrated, with a stepped bore extending therethrough to define internal, cylindrical, upper and lower walls 5 and 6, respectively, with the lower wall 6 opening into the combustion chamber 3. As shown, lower wall 6 is of reduced diameter relative to upper wall 5 and these walls are interconnected by a flat shoulder 7.

Fuel injector 10 includes a cylindrical piston 11 having an upper portion 12 and a lower portion 14 of reduced diameter relative to the upper portion. The upper portion 12 is interconnected with the lower portion 14 by a flat abutment shoulder 15. The lower portion 14 of piston 11 is reciprocably received in the lower wall 6 of the cylinder head 2. At least one seal ring 16, positioned in a suitable annular groove 17 provided for this purpose in the outer peripheral surface of the lower portion 14, is used to provide a seal fitting between the lower portion 14 of piston 11 and the lower wall 6.

The upper portion 12 and an adjacent lower portion 14 of the piston 11 are reciprocably received in the through, stepped bore provided in a circular plate-like body 20. The body 20 together with an inverted, cup-shaped solenoid housing 21 are suitably fixed, as by circumferentially spaced-apart cap screws 22, to the cylinder head 2, with the stepped bore in body 20 being positioned concentric with the stepped bore in the cylinder head 2. For this purpose, in the construction illustrated, the lower reduced diameter portion 20a of the body 20 is received by the upper wall 5 of the cylinder head 2.

Each cap screw 22, only one being shown in the Figure, extends through associated, aligned, apertures 23 and 24 provided in the flange portion 25 of solenoid housing 21 and in the body 20, respectively, for engagement in an associated internally threaded aperture 26 provided for this purpose in the cylinder head 2.

The stepped bore in body 20 provides a cylindrical internal upper wall 30 of a diameter to slidably receive the upper portion 12 of piston 11 and, a cylindrical internal lower wall 31 of a suitable diameter whereby to loosely receive the lower portion 14 of the piston. Upper wall 30 and lower wall 31 are interconnected by a flat shoulder 32. In the instruction illustrated, a pair of seal rings 33, positioned in suitable annular grooves 34 provided in the outer peripheral surface of the upper portion 12, are used to effect a seal fitting between this upper portion 12 of piston 11 and the upper wall 30 of body 20.

Piston 11 at its lower end has a depending, conically shaped spray tip 40 formed integral therewith. In addition, piston 11 is provided with a stepped blind bore that extends from the end opposite the spray tip 40 a predetermined distance into the spray tip 40. This blind bore in the piston 11 provides a cylindrical internal upper wall 41, a cylindrical intermediate wall 42 and a lower conical wall 43. Conical wall 43 thus, in effect, defines a discharge passage for fuel and an annular pintle valve seat for a valve member to be described, used to control the discharge of fuel out through this discharge passage. As shown, wall 42 is of reduced internal diameter relative to wall 41 and is interconnected to it by a shoulder 44. Conical wall 43 at one end merges into the wall 42 and, at its other end terminates within the spray tip 40, with the spray tip being provided with at least one discharge orifice 45 for the discharge of fuel from the discharge passage defined by wall 43 into the combustion chamber 3.

A combined valve-bushing means 50, having tapered conical tip portion 51 at its lower closed end, is reciprocably journaled by wall 42 of piston 11. As shown, the tapered conical tip 51 of the valve-bushing means is suitably tapered relative to the taper of the conical wall 43 of spray tip 40 so as to provide a conical seating surface 52 which is adapted to sealingly engage a seat portion of the wall 43 of the spray tip 40 of piston 11. As shown, the valve-bushing means 50 is reciprocable between a closed position at which the conical sealing surface 52 sealingly engages wall 43 and an open position at which the sealing surface 52 is spaced from wall 43.

Valve-bushing means 50 is also provided with a blind bore 53 that extends downward from the upper end of this member whereby to define, with a pump plunger to be described, a variable volume injection pump chamber 54. Valve bushing 50 is also provided with a plurality of circumferentially spaced apart radial ports 55, only one being shown in the drawing. Each such radial port 55 is in flow communication at one end with the lower end of the injector pump chamber 54 and at its other end with an annular groove 56 provided in the outer peripheral surface of the tapered conical tip 51 closely adjacent to, but above the seating surface 52 thereon.

A closure cap, generally designated 60, having an integral depending stepped plunger portion 62, is supported on the upper edge 27a of an annular flange 27 upstanding from the upper surface of the body 20. Closure cap 60, in the construction illustrated, includes an upper circular flange portion 61 of a suitable diameter to be received within the depending side wall of the solenoid housing 21 and, the cylindrical plunger portion 62 depending therefrom.

In the construction illustrated, the plunger portion 62 includes an upper control plunger 63 reciprocably received by the upper wall 41 of piston 11, an intermediate portion 64 and a lower pump plunger 65 reciprocably received by the wall defined by the blind bore 53 in valve bushing 50. As shown, the intermediate portion 64 and the lower pump plunger 65 are of progressively reduced outside diameters relative to the upper control plunger 63. Control plunger 65 and the intermediate portion 64 are interconnected by a shoulder 66. A ring seal 67, positioned in a suitable annular groove 68 provided for this purpose in the outer peripheral surface of the upper control plunger 63, is used to provide a seal fitting between this control plunger and the upper wall 41, whereby to define therewith an annular, variable volume, control chamber 70.

As will be apparent, the axial extent of the lower pump plunger 65 is predetermined relative to the axial extent of the blind bore 53 in the valve-bushing means 50 whereby these elements are operative to define the variable volume injection pump chamber 54.

As shown, the lower pump plunger 65 is provided with an axial extending groove 71 in the outer peripheral surface thereof which extends a predetermined distance so that when the lower pump plunger 65 is positioned as shown in the drawing relative to the valve-bushing means 50, the upper end of the groove 71 forms with the valve-bushing means an injection chamber port to effect flow communication between the injection pump chamber 54 and the control chamber 70.

A coil return spring 72 is positioned in the control chamber 70 so as to encircle the intermediate portion 64 and lower pump plunger 65. One end of this return spring 72 abuts against the shoulder 66 of closure cap 60 while its opposite end abuts against a spring retainer washer 73 that loosely encircles the lower pump plunger so as to abut against the upper edge surface of the valve-bushing means 50 whereby the return spring 72 is operative to normally bias the seating surface 52 of the valve-bushing means 50 into sealing engagement with the lower conical wall 43 of piston 11 to therefore also bias this piston 11 in an axial direction, downward with reference to the drawing. Downward movement of the piston 11 is limited by engagement of the abutment shoulder 15 of the piston against the shoulder 32 of body 20, the position shown in the drawing. In a particular construction, the force of the return spring was a predetermined amount less than 100 lbs. (414.8 newtons) for a purpose to be described hereinafter.

At its upper end, the closure cap 60 is provided with a stepped blind bore that extends downward into the intermediate portion 64 thereof whereby to define, starting from the upper surface of flange 61 an internal cylindrical upper wall 74, an upper intermediate wall 75, a lower intermediate wall 76 and a lower wall 77. Walls 75, 76 and 77 are of progressively reduced internal diameters relative to wall 74. Walls 74 and 75 are interconnected by a flat shoulder 78. Walls 75 and 76 are interconnected by a flat shoulder 80 and walls 76 and 77 are interconnected by a flat shoulder 81.

In the construction illustrated, a cylindrical valve seat element 82, with an axial passage 83 therethrough, is positioned in the portion of the bore in the closure cap 60 defined by the lower intermediate wall 76 so as to abut against the flat shoulder 81. The passage 83 and the lower wall 77 thus define a fuel passage 77-83 which, by means of a cross bore 84 intersecting the lower end of wall 77, is in flow communication at one end, lower end with reference to the drawing, with the control chamber 70.

In accordance with a feature of the invention, flow of fuel from the control chamber 70 out through the passage 77-83 is controlled by means of a solenoid actuated valve assembly, generally designated 85. In the construction shown, this solenoid actuated valve assembly 85 includes a tubular core bobbin 86 supporting a wound wire coil 87 that is adapted to be connected by suitable electrical leads, not shown, to a suitable control source of electrical power, not shown. Bobbin 86 is positioned in the solenoid housing 21 between the upper end of flange 61 of closure cap 60 and an internal flat shoulder 21a of the solenoid housing 21.

An externally stepped, cylindrical pole piece 90 has its lower reduced diameter pole end 90a received within the internal bore wall 86a of bobbin 86 to effect co-axial alignment thereof. This pole piece 90 is axially adjustably fixed to the solenoid housing 21 as by having the external threads 90b at its enlarged upper end threadingly engaged with the internal threads 21b provided by a threaded bore extending through the upper end wall of the solenoid housing 21. A lock nut 91 threaded onto the threads 90b of the pole piece so as to abut against the upper end of the solenoid housing 21 completes this assembly.

Seals 92 and 93 are used to effect a seal between the shoulder 78 of closure cap 60 and the lower end of bobbin 86 and between the upper internal enlarged diameter bore wall 86a of bobbin 86 and the outer peripheral surface of the reduced diameter portion of pole piece 90.

In the construction shown, the pole piece 90 is provided with a through axial passage 94 that extends through a reduced diameter, upward extending fitting portion 95 of the pole piece 90. The fitting portion 95 is adapted for connection to a suitable source of fuel, not shown, whereby the subject fuel injector 10 can be supplied with fuel at a suitable supply pressure. As shown, the lower enlarged portion 94a of passage 94 opens into a fuel chamber 96 defined by the internal bore wall 86a of bobbin 86 and the upper intermediate wall 75 of the closure cap 60.

A cylindrical armature 100, slidably guided for axial movement in the bore wall 86a of bobbin 86, is positioned in the fuel chamber 96 for movement between a closed position at which it is seated against the valve seat 82a on the upper surface of the seat element 82 and an open position at which it is unseated from this valve seat.

Armature 100 is provided with a plurality of circumferentially spaced apart axially extending slots 101 on the outer peripheral surface thereof and with a stepped axial bore 102 extending therethrough. Bore 102 defines a fuel passage through the armature 100 that is co-axial with passage 77-83, with flow through the supply passage being controlled by a one-way check valve. In the construction illustrated, this check valve is in the form of a ball check valve 104 that is normally bias by a spring 105 into seating engagement with an apertured valve seat member 106 secured, as by a press fit, in the bore 102.

Armature 100 is normally biased by a spring 110 in an axial direction, downward with reference to the drawing, to the closed position, as shown. Spring 110 at one end abuts against an internal shoulder 90c of the pole piece 90 and, at its other end abuts against the valve seat member 106.

As shown, the upper end of piston 11 defines, with the upper end of the plunger portion 62 of closure cap 60, a nonworking variable volume chamber 111 which, in the embodiment illustrated is in flow communication with the atmosphere. For this purpose, a radial passage 112 is provided, for example, in the depending rim of the closure cap 60 so as to communicate at one end with the chamber 111 and at its opposite end with an inclined slot 114 formed in the flange 25 of the solenoid housing 21 adjacent to the internal peripheral edge thereof. As shown, slot 114 communicates with an angled port 115 extending through the flange 25 of the solenoid housing 21 so as to commute with the atmosphere.

Operation of the Compression Operated Injector

Fill Mode

Fuel at a suitable supply pressure is continuously supplied via the fitting 95 and passage 94 to the fuel chamber 96. Thus at the end of an operating cycle, when the pressure in the combustion chamber 3 is sufficiently reduced, the return spring 72 will be operative to move the piston 11 to the position shown, a position at which the shoulder 15 of piston 11 abuts shoulder 32 of body 20. Since the force of this return spring 72 is transmitted to the piston 11 by means of the valve-bushing means 50, the seating surface 52 of the valve-bushing means 50 will also be seated against the valve seat defined by the lower conical wall 43 at the spray tip end of the piston. The pressure of fuel within the fuel chamber 96 is then operative to effect unseating of the ball check valve 104, against the biasing action of spring 105, to permit fuel, to flow from chamber 96 into the control chamber 70 whereby to maintain the pressure of fuel therein at the nominal supply pressure. At this time, fuel from the control chamber 70 can also flow through the injector chamber port, at the top of the groove 71 in the lower pump plunger 65, into the injection pump chamber 54.

Cocked Mode

As the pressure in the combustion chamber 3 rises, at a predetermined pressure, it will be effective acting on the combustion chamber exposed end of piston 11 to force the piston 11 on a power stroke, upward with reference to the drawing, to thereby compress the fuel in the control chamber 70 and in the injection pump chamber 54 and raising its pressure. As this occurs, the ball check valve 104 seats against the valve seat element 106. As the piston 11 initially moves upward, and if the injection chamber port does not close, the pressure of fuel in both the control chamber 70 and in the injection pump chamber 54 will increase, for example in a particular injector structure, to approximately 2,000 psi (13,709 kPa). However, if the port does close during this initial upward movement of piston 11, the pressure of fuel in the injection pump chamber 54 may increase above the above defined pressure, but the pressure of fuel in the control chamber 70 will balance most of the combustion chamber 3 pressure and prevent injection. In both cases, as this occurs, further upward movement of the piston is prevented by the effective balancing of forces acting on opposite ends of piston 11.

Injection Mode

When the coil 87 of the solenoid is energized, the armature 110 will be caused to move upward to its open position relative to the valve seat element 82 to then allow the high pressure fuel in the control chamber 70 to escape back into the fuel chamber 96 thus causing a drop in the pressure of fuel in the control chamber. As this occurs the pressure in the combustion chamber 3 acting on the piston 11 is resisted by only the pressure of fuel in the injection pump chamber 54 and by the force of the return spring 72. Therefore, the piston will again be moved upward as a result of the pressure existing in the combustion chamber.

As the piston 11 moves upward, the port opening at the end of the supply groove 71 of the lower pump plunger 65 will become closed, that is, by the outer peripheral land portion of this plunger 65 coming into sliding engagement with the wall defined by the blind bore 53 of the valve-bushing means 50. When this occurs, upward movement of the piston 11 relative to the pump plunger 65 continues, the pressure in the injection pump chamber 54 will rapidly rise to a high value, for example, to approximately 20,000 psi (137,900 kPa) in the injector structure referred to hereinabove.

The area between the pintle seat, defined by the conical wall 43 in the spray tip end of plunger 11 and the valve-bushing means 50 outer diameter, is greater than the plunger area by some predetermined value. Therefore, there is a predetermined force, for example 100 lbs. (414.8 newtons) in the injector structure referred to, acting on the return spring 72 which is greater than the preselected lower value, described hereinbefore, of the force spring 72. Accordingly, the valve-bushing means 50 will move upwards to allow fuel to be discharged via the radial ports 55 into the discharge passage of spray tip for discharge therefrom via the discharge orifices 45.

Standby Mode (Injection Stop)

When the coil 87 of the solenoid assembly is again deenergized, the spring 110 will effect movement of the armature 100 to the closed position, a position, as shown, at which the armature is seated against the valve seat element 82, thus preventing further discharge of fuel from the control chamber 70 back to chamber 96. As this occurs, assuming, continued further upward movement of the piston 11 due to pressure in the combustion chamber 3, the pressure of fuel in the control chamber 70 will again increase. If the pressure of fuel in the control chamber reaches for example a pressure of 2120 psi (14,616 kPa) this pressure would together with the force of return spring 72 counteract the force applied from the gases in the combustion chamber 3 without any help from the pressure of fuel in the injection pump chamber 54. Accordingly it will be apparent that because of this sometime before this above-identified pressure level is reached, the piston 11 will stop its upward movement and the return spring 72 will effect closing movement of the valve-bushing means 50 to terminate fuel injection. In this condition, the injector will remain static until the pressure in the combustion chamber again drops sufficiently to allow the injector to once again enter the fill mode described hereinabove.

The embodiments of the invention in which an exclusive property or privilege is claimed are defined as follows:

1. A compression pressure operated injector for direct injection of fuel to an engine combustion chamber; said injector including a housing means providing a piston cylinder means open at one end for communication with the combustion chamber; a piston means reciprocably received in said piston cylinder means, said piston means providing a discharge passage with a valve seat therein terminating at a spray tip at one end thereof for the discharge of fuel to the combustion chamber; a stepped plunger fixed at one end in said housing means coaxial with said piston cylinder means to form therewith a control chamber; a valve-bushing member movable in said discharge passage for controlling discharge from said spray tip and forming with a portion of said stepped plunger an injection pump chamber; a fill port means operatively associated with said stepped plunger and said valve-bushing member for controlling communication between said injection pump chamber and said control chamber; spring means operatively positioned to normally bias said piston means and said valve-bushing member in a first direction whereby said fill port means is in communication with said control chamber and said valve-bushing member is seated against said valve seat; and, a solenoid actuated valve controlled passage means in said housing means in flow communication at one end with said control chamber and adapted at its other end to be connected to a source of fuel and being operable when energized to permit flow from said control chamber to the source of fuel.

2. A direct injection, compression pressure operated injector for delivering fuel directly to an engine combustion chamber; said injector including a housing means providing a piston cylinder means open at one end for communication with the combustion chamber; a piston means reciprocably received in said piston cylinder means, said piston means providing a discharge passage with a valve seat therein terminating at a spray tip at one end thereof having orifice passages therein for the discharge of fuel to the combustion chamber; a tubular valve-bushing member movable in said discharge passage between an open position and a closed position relative to said valve seat, said valve-bushing member providing a plunger cylinder in communication at one end with said discharge passage upstream of said valve seat; a stepped plunger fixed in said housing means and having one end thereof slidably journaled in said plunger cylinder and a second portion slidable in said piston means to form therewith an injection pump chamber and a control chamber, respectively; a fill port means in said stepped plunger cooperating with said valve-bushing member for controlling communication between said injection pump chamber and said control chamber; spring means operatively associated with said valve-bushing member and said piston means to normally bias said piston means and therefore said valve-bushing member in a first direction at which said fill port means is in communication with said control chamber; said housing means having a supply passage connected to said control chamber for supplying fuel thereto; and, a solenoid actuated valve means positioned in said supply passage adapted to permit flow from said supply passage to said control chamber and biased to obstruct flow from said control chamber to said supply passage upon an increase in control chamber pressure, said solenoid actuated valve means being operable when energized to permit flow from said control chamber to said supply passage whereby the control chamber pressure may be reduced so that combustion pressure in the combustion chamber will cause said piston means to move relative to said stepped plunger to effect pressurization of fuel in said injection pump chamber whereby pressurize fuel in said injection-pump chamber to effect unseating of said valve-bushing member relative to said valve seat whereby fuel can be discharged from said spray tip into the combustion chamber.

3. A direct injection, compression pressure operated injector including a housing means providing a piston cylinder open at one end for communication with the combustion chamber; a piston means reciprocably received in said piston cylinder, said piston means having a spray tip at one end thereof and having a passage with a valve seat therein terminating at said spray tip; a valve-bushing member movable in said passage between an open position and a closed position relative to said valve seat, said valve-bushing member providing a cylinder in communication at one end with said passage directly upstream of said valve seat; a stepped plunger fixed in said housing means and having one end thereof slidably journaled in said valve-bushing member and a second portion slidable in said piston means to form therewith an injection pump chamber and a control chamber, respectively; a fill port means in said stepped plunger cooperating with said valve-bushing member for controlling flow between said injection pump chamber and said control chamber; spring means operatively associated with said valve-bushing member and said piston means to normally bias said piston means and said valve-bushing member in a first direction at which said fill port means is in communication with said control chamber and said valve-bushing member engages said valve seat; passage means in said housing means for supply fuel to said control chamber; and, a solenoid actuated valve means operatively associated with said passage means and adapted to permit flow from said passage to said control chamber and normally biased to obstruct flow from said control chamber to said passage upon an increase in control chamber pressure, said solenoid actuated valve means being operable when energized to permit flow from said control chamber to said passage to cause a reduction in control chamber pressure whereby said piston means is caused by pressure in the combustion chamber to move relative to said stepped plunger for effect further pressurization of fuel in said injection pump chamber so as to effect unseating of said valve-bushing member relative to said valve seat for the discharge of fuel from said spray tip.

4. A direct injection, compression pressure operated injector for delivering fuel directly to an engine combustion chamber; said injector including a housing means providing a piston cylinder open at one end for communication with the combustion chamber; a piston means reciprocably received in said piston cylinder, said piston means providing a discharge passage with a valve seat therein and terminating at a spray tip at one end thereof having orifice passages therein for the discharge of fuel to the combustion chamber; a tubular valve-bushing member movable in said discharge passage between an open position and a closed position relative to said valve seat, said valve-bushing member providing a plunger cylinder in communication at one end with said discharge passage upstream of said valve seat a stepped plunger fixed in said housing means and having a first plunger portion thereof slidably journaled in said piston means to form therewith a control chamber and a second plunger portion of reduced diameter relative to said first portion slidable in said plunger cylinder to form therewith an injection pump chamber; a fill port means operatively associated with said second plunger portion and with said plunger cylinder for controlling flow communication between said injection pump chamber and said control chamber; spring means operatively associated with said valve-bushing member and said piston means to normally bias said piston means toward the combustion chamber and therefore moving said valve-bushing member to said closed position at which said fill port means effects communication between said control chamber and said injection pump chamber; said housing means having a fuel supply passage means in communication with said control chamber; and, a solenoid actuated valve positioned in said fuel supply passage means adapted to permit flow from said fuel supply passage means to said control chamber and normally biased to obstruct flow from said control chamber to said fuel supply passage means upon an increase in control chamber pressure, said solenoid actuated valve being operable when energized to permit flow from said control chamber to said fuel supply passage means whereby the control chamber pressure may be reduced so that combustion pressure in the combustion chamber will cause said piston means to effect pressurization of fuel in said injection pump chamber so as to effect movement of said valve-bushing member to said open position whereby fuel can be discharged from said stray tip into the combustion chamber.

* * * * *